United States Patent [19]

West et al.

[11] Patent Number: 4,673,255

[45] Date of Patent: Jun. 16, 1987

[54] METHOD OF CONTROLLING MICRODROPLET GROWTH IN POLYMERIC DISPERSED LIQUID CRYSTAL

[76] Inventors: John West, 5050 Fish Creek Rd., Stow, Ohio 44224; Attilio Golemme, 350 Silver Oaks Dr.-#2; Joseph W. Doane, 1618 S. Lincoln St., both of Kent, Ohio 44240

[21] Appl. No.: 879,269

[22] Filed: Jun. 27, 1986

Related U.S. Application Data

[63] Continuation-in-part of Ser. No. 866,216, May 22, 1986, which is a continuation-in-part of Ser. No. 776,831, Sep. 17, 1985, which is a continuation-in-part of Ser. No. 590,996, Mar. 19, 1984, abandoned.

[51] Int. Cl.$^4$ .............................................. G02F 1/13
[52] U.S. Cl. .............................. 350/347 V; 350/320; 350/350 R
[58] Field of Search ............... 350/320, 347 V, 347 R, 350/350 R, 351

[56] References Cited

U.S. PATENT DOCUMENTS

| | | | |
|---|---|---|---|
| 2,123,902 | 7/1938 | Land . | |
| 3,529,156 | 9/1970 | Fergason et al. . | |
| 3,578,844 | 5/1971 | Churchill et al. | 350/351 |
| 3,585,381 | 6/1971 | Hodson et al. | 250/47 |
| 3,600,060 | 8/1971 | Churchill et al. | 350/351 X |
| 3,620,889 | 11/1971 | Baltzer | 161/5 |
| 3,661,142 | 5/1972 | Flam | 128/2 H |
| 3,663,390 | 5/1972 | Fergason et al. | 204/158 HE |
| 3,697,297 | 10/1972 | Churchill et al. | 350/351 |
| 3,720,623 | 3/1973 | Cartmell et al. | 252/316 |
| 3,746,426 | 7/1973 | Masi . | |
| 3,748,017 | 7/1973 | Yamamura et al. . | |
| 3,766,061 | 10/1973 | Mahler et al. . | |
| 3,771,855 | 11/1973 | Burns . | |
| 3,772,518 | 11/1973 | Murayama et al. | 250/211 R |
| 3,781,085 | 12/1973 | Leibowitz . | |
| 3,795,529 | 3/1974 | Cartmell et al. . | |
| 3,804,618 | 4/1974 | Forest et al. | 96/1 R |
| 3,816,786 | 6/1974 | Churchill et al. | 313/91 |
| 3,852,092 | 12/1974 | Patterson et al. | 117/36.7 |
| 3,864,023 | 2/1975 | Glaser et al. | 117/217 X |
| 3,872,050 | 6/1975 | Benton et al. | 350/351 X |
| 3,877,790 | 4/1975 | Robinson . | |
| 3,885,982 | 5/1975 | Fergason | 106/252 |
| 3,892,471 | 7/1975 | Biermann et al. | 313/517 X |
| 3,912,366 | 10/1975 | Sprokel . | |
| 3,932,024 | 1/1976 | Yaguchi et al. . | |
| 3,935,337 | 1/1976 | Taylor | 427/180 |
| 3,961,843 | 6/1976 | Nakamura et al. . | |
| 3,969,264 | 7/1976 | Davis . | |
| 3,985,427 | 10/1976 | Masi . | |
| 3,990,782 | 11/1976 | Yamasaki . | |
| 3,998,210 | 12/1976 | Nosari | 128/2 H |
| 4,022,706 | 5/1977 | Davis | 252/299.1 |
| 4,023,890 | 5/1977 | Shirasu et al. . | |

(List continued on next page.)

FOREIGN PATENT DOCUMENTS

| | | | |
|---|---|---|---|
| 2139537 | 1/1973 | France | 350/331 R |
| 55-96922 | of 0000 | Japan . | |
| 51-30998 | 9/1976 | Japan . | |

OTHER PUBLICATIONS

Craighead, et al., "New Display Based on Electrically Induced Index Matching in an Inhomogeneous Medium", Appl. Phys. Lett., vol. 40, No. 1, Jan. 1, 1982, pp. 22–24.

*Primary Examiner*—Bruce Y. Arnold
*Assistant Examiner*—Richard F. Gallivan
*Attorney, Agent, or Firm*—Watts, Hoffmann, Fisher & Heinke Co.

[57] ABSTRACT

The invention provides a method of controlling the rate of growth of liquid crystal microdroplets formed in situ by the phase separation of a homogeneous solution of liquid crystal and polymer. Temperature, relative concentration and choice of materials determine the microdroplet growth rate and resultant microdroplet size and density. Controlling growth rate allows for fabrication of liquid crystal display devices with optimized display characteristics and response times.

17 Claims, 2 Drawing Figures

U.S. PATENT DOCUMENTS

| | | | |
|---|---|---|---|
| 4,048,358 | 9/1977 | Shanks | 350/351 X |
| 4,070,912 | 1/1978 | McNaughton et al. | 73/356 |
| 4,161,557 | 7/1979 | Suzuki et al. | 428/1 |
| 4,200,361 | 4/1980 | Maluano et al. | 350/336 |
| 4,218,281 | 8/1980 | Doriguzzi et al. | 156/281 |
| 4,297,401 | 10/1981 | Chern et al. | 428/1 |
| 4,301,023 | 11/1981 | Schuberth et al. | 252/299.1 |
| 4,310,557 | 1/1982 | Davison et al. | 428/1 |
| 4,325,610 | 4/1982 | Inoue | 350/343 |
| 4,388,139 | 6/1983 | Fuller | 156/307.5 |
| 4,401,537 | 8/1983 | Chern et al. | 204/159.11 |
| 4,418,102 | 11/1983 | Ferrato | 428/1 |
| 4,427,888 | 1/1984 | Galvin | 250/331 |
| 4,435,047 | 3/1984 | Fergason | 350/350 R X |
| 4,596,445 | 6/1986 | Fergason | 350/347 V |
| 4,601,545 | 7/1986 | Kern | 350/347 V |

METHOD OF CONTROLLING MICRODROPLET GROWTH IN POLYMERIC DISPERSED LIQUID CRYSTAL

RELATED APPLICATIONS

This application is a continuation-in-part of U.S. patent application Ser. No. 866,216, filed May 22, 1986 which is a continuation-in-part of U.S. patent application Ser. No. 776,831, filed Sept. 17, 1985, which is a continuation-in-part of U.S. patent application Ser. No. 590,996, filed Mar. 19, 1984, now abandoned.

TECHNICAL FIELD

This invention relates generally to liquid crystal display technology and, more specifically, to a method of optimizing display characteristics and response times by controlling the growth rate of microdroplets of liquid crystal formed in situ by the phase separation of a homogeneous solution of liquid crystal and polymer.

BACKGROUND ART

Recent developments in the fabrication of liquid crystal display devices have been directed toward materials which display images by exploiting the light scattering properties of liquid crystals entrapped in discrete quantities in a plastic matrix. The display characteristics of these materials depend on the size and morphology of the entrapped liquid crystals. Characteristics such as scattering efficiency and switching time before ON and OFF states are affected by the diameter and density of the discrete quantities of liquid crystal.

Materials useful for light scattering displays occur when the diameter of the entrapped liquid crystals is such that they scatter incident light, i.e., on the order of about 0.2 to 10 microns in diameter.

Attempts at controlling the volume in which liquid crystals are entrapped have included imbibing liquid crystals into microporous plastic sheets, as disclosed in U.S. Pat. No. 4,048,358 and emulsifying liquid crystals with an immiscible binder such as polyvinyl alcohol to form encapsulated liquid crystal droplets, as disclosed in French Pat. No. 2,139,537 and U.S. Pat. No. 4,435,047.

These prior art techniques involving the mechanical entrapment of liquid crystals have some drawbacks. Encapsulation by emulsification can yield a relatively broad spectrum of capsule diameters which can necessitate sizing or sieving to achieve uniformity. Entrapment by imbibing into microporous plastic may obviate the sizing problem, but presents the further problem of sealing the micropores to prevent leakage of the liquid crystals.

Co-pending U.S. patent application Ser. No. 776,831, the disclosure of which is incorporated by reference, describes a light modulating material comprising droplets of liquid crystal dispersed in a solid, cured polymer prepared by dissolving the liquid crystal in uncured polymer and thereafter curing the mixture to cause the liquid crystal to phase separate as microdroplets.

Co-pending U.S. patent application Ser. No. 866,216, the disclosure of which is incorporated by reference, teaches the fabrication of light modulating material comprising microdroplets of liquid crystal in a thermoplastic matrix prepared by dissolving the liquid crystal in thermoplastic polymer to form a homogeneous solution and thereafter phase separating the solution to create in situ microdroplets.

Co-pending U.S. patent application Ser. No. 879,327, the disclosure of which is incorporated in reference, describes the preparation of a bistable memory material with high resistivity and permittivity comprising at least 50% by weight liquid crystal prepared by the phase separation of a homogeneous solution of liquid crystal and polymer.

As distinguished from prior art describing mechanical entrapment of liquid crystals, U.S. patent application Ser. Nos. 776,831, 866,216, and 879,327 describe materials having the advantages of ease of preparation and control of microdroplet size.

DISCLOSURE OF THE INVENTION

The invention is based on the discovery that precise control of microdroplet size is possible by controlling the growth rate of the liquid crystal microdroplets during phase separation of a homogeneous solution of liquid crystal and polymer while the two materials are still in the liquid phase, but have become immiscible. Temperature, relative concentration, and choice of materials determine the growth rate and the resultant microdroplet size and density. Controlling growth rate allows for fabrication of liquid crystal display devices with optimized display characteristics such as contrast and response time.

In the specification and the claims "thermoplastic" is used in its usual sense and includes within its meaning epoxy resins and the like which are modified to exhibit thermoplastic properties by the addition of a non cross-linking agent.

The term "homogeneous solution" or "single phase" solution refers to a miscible mixture of liquid crystal and polymer which appears clear and homogeneous. "Phase separation" refers to manipulation of the homogeneous solution to cause the polymer to separate as one phase and the liquid crystal to form microdroplets as a second phase. Phase separation is accomplished by curing or polymerizing a solution of resin and liquid crystal; by cooling a solution of liquid crystal and thermoplastic resin heated to a temperature sufficient to dissolve the liquid crystal; or by evaporating a solvent in which the polymer and liquid crystal are mutually soluble. During phase separation the homogeneous solution passes through a liquid-phase separation phase wherein the liquid crystal and the polymer are both still liquid, but have become immiscible. As phase separation proceeds, the polymer hardens so that when phase separation is complete the result is a liquid-crystal-rich phase in the form of microdroplets and a polymer-rich-phase in the form of a matrix in which the microdroplets are embedded.

In accordance with the invention there is provided a method of making liquid crystal microdroplets dispersed in a polymeric matrix the improvement comprising the step of controlling microdroplet growth so that the microdroplets have a selected average diameter when phase separation is complete.

In one aspect of the invention, the step of controlling the rate of microdroplet growth is carried out by controlling the rate of curing a homogeneous solution comprising curable synthetic polymer and liquid crystal by selecting a polymer having a predetermined curing rate at room temperature or by adjusting the intensity of ultraviolet radiation. The rate of curing can be accelerated or retarded by raising or lowering the temperature at which the resin is cured.

In another aspect, the step of controlling the rate of microdroplet growth can be carried out by adjusting the ratio of liquid crystal to polymer.

In a further aspect, the step of controlling the rate of microdroplet growth can be carried out by controlling the rate of cooling of a homogeneous solution of liquid crystal and thermoplastic polymer heated to a temperature sufficient to dissolve the liquid crystal.

Preferably, the liquid crystals are of the nematic-type or mixtures of liquid crystals that behave as the nematic types. Most preferably, the liquid crystals comprise cyanobiphenyls and may be mixed with cyanaoterphenyls and esters.

Light incident upon the materials of the invention is either scattered or transmitted by the microdroplets depending upon the relationship among the indices of refraction of the liquid crystal and the polymer in which it is embedded. Application of an electric field in a direction normal to the surface of the material in which the microdroplets comprise a liquid crystal with positive dielectric anisotropy results in the long axis of the liquid crystals aligning with the field. The long axis defines the optic axis of the microdroplet; it is along this axis that the extraordinary index of refraction $n_e$ is measured, while the ordinary index $n_o$ is measured in a plane perpendicular to the long axis. Employing a polymer having an index of refraction $n_s$ substantially similar to $n_o$ results in a material which transmits light in the presence of a normally applied field due to the fact that incident light detects no mismatch between the indices $n_o$ and $n_s$. Removal of the field allows the optic axes of the microdroplets to return to an essentially random arrangement; incident light detects a mismatch between the index of the polymer and those of the microdroplets and is scattered.

The size and shape of the microdroplets affect the rapidity of the return of the optic axis to the random state and the degree to which light is scattered. Hence, fabrication of display devices utilizing the techniques of the present invention to control the growth of microdroplets results in liquid crystal display devices having optimized display characteristics, such as contrast and response times.

In general, smaller microdroplets yield faster switch times upon the application of an electric field, but require a greater threshold switching voltage than larger microdroplets. While not wishing to be bound by any particular theory of operation, this phenomenon appears due to the competition between the surface of the microdroplet and the external field: The smaller the microdroplet, the larger the surface to volume ratio and hence the more influential the surface. Larger microdroplet displays have a lower threshold voltage because there is less surface area force to overcome.

The techniques of the present invention make possible the selection of switching time depending upon the ultimate application of the display device. Where fast switching times are needed, such as in flat panel displays which update images faster than detectable by the human eye, the techniques of the present invention allow for the fabrication of small microdroplets. Where fast switching times are not necessary, such as in various alphanumeric time and temperature displays, the present techniques permit the formation of larger microdroplets.

In general, light scattering efficiency increases as microdroplet diameter approaches the wavelength of light; increased scattering efficiency increases the contrast betwen the ON and OFF states. Where greater contrast is needed, such as in projection type displays employing a relatively narrow wavelength spectrum source, the techniques of the present invention enable the production of microdroplets approximating the wavelength of the source.

The present invention also allows for the fabrication of light shutters for regions of the electro-magnetic spectrum other than the visible, such as the infrared or ultraviolet regions, by enabling the formation of microdroplets having diameters approximately the wavelength of infrared or ultraviolet radiation.

Still other advantages and features will become apparent to those skilled in the art from the following description of the best modes of the invention and the accompanying drawings.

BEST MODE FOR CARRYING OUT THE INVENTION

Figure 1:
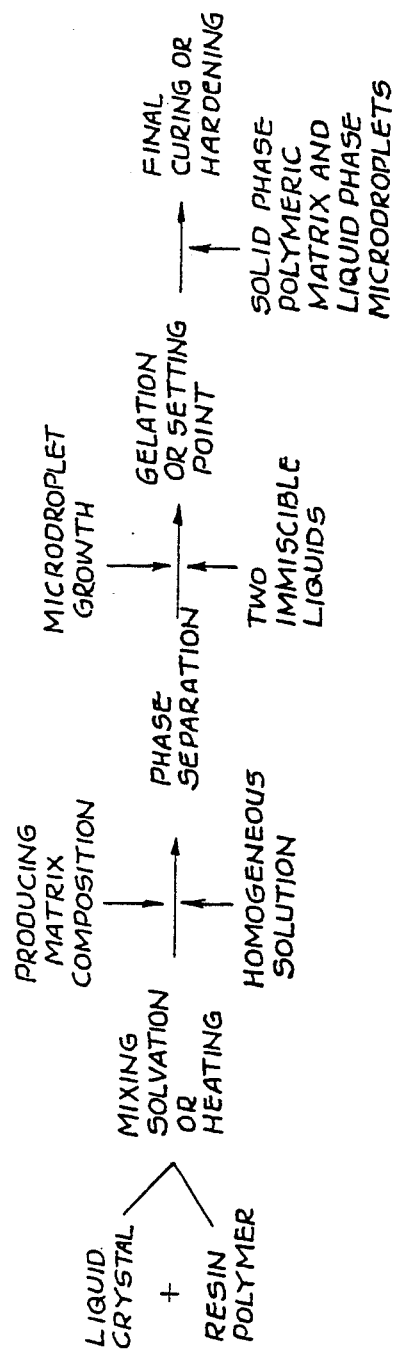
FIG. 1 is a schematic of the sequence of steps in the preparation of the material of the invention.

The preparation of the light scattering materials of the invention involves the general sequence shown in FIG. 1. Referring to FIG. 1, it has been discovered that choice of starting materials before mixing, solvation or heating, and manipulation of the mixture after it enters phase separation but before gelation or setting of the polymer permits the control of the microdroplet growth rate.

The nature of starting materials, i.e. liquid crystal and polymer, affects the solubility of the liquid crystal in the polymer and determines both the composition of the homogeneous solution and the point at which the phase separation occurs and the rate at which it proceeds. The relative concentration of the starting materials also affects phase separation rate. Changes in temperature of curing change the solubilities, the rate of polymerization and the rate of diffusion of the liquid crystal out of the polymer into the microdroplets. The rate of cooling of a liquid crystal thermoplastic solution affects the rate of microdroplet growth.

Figure 2:
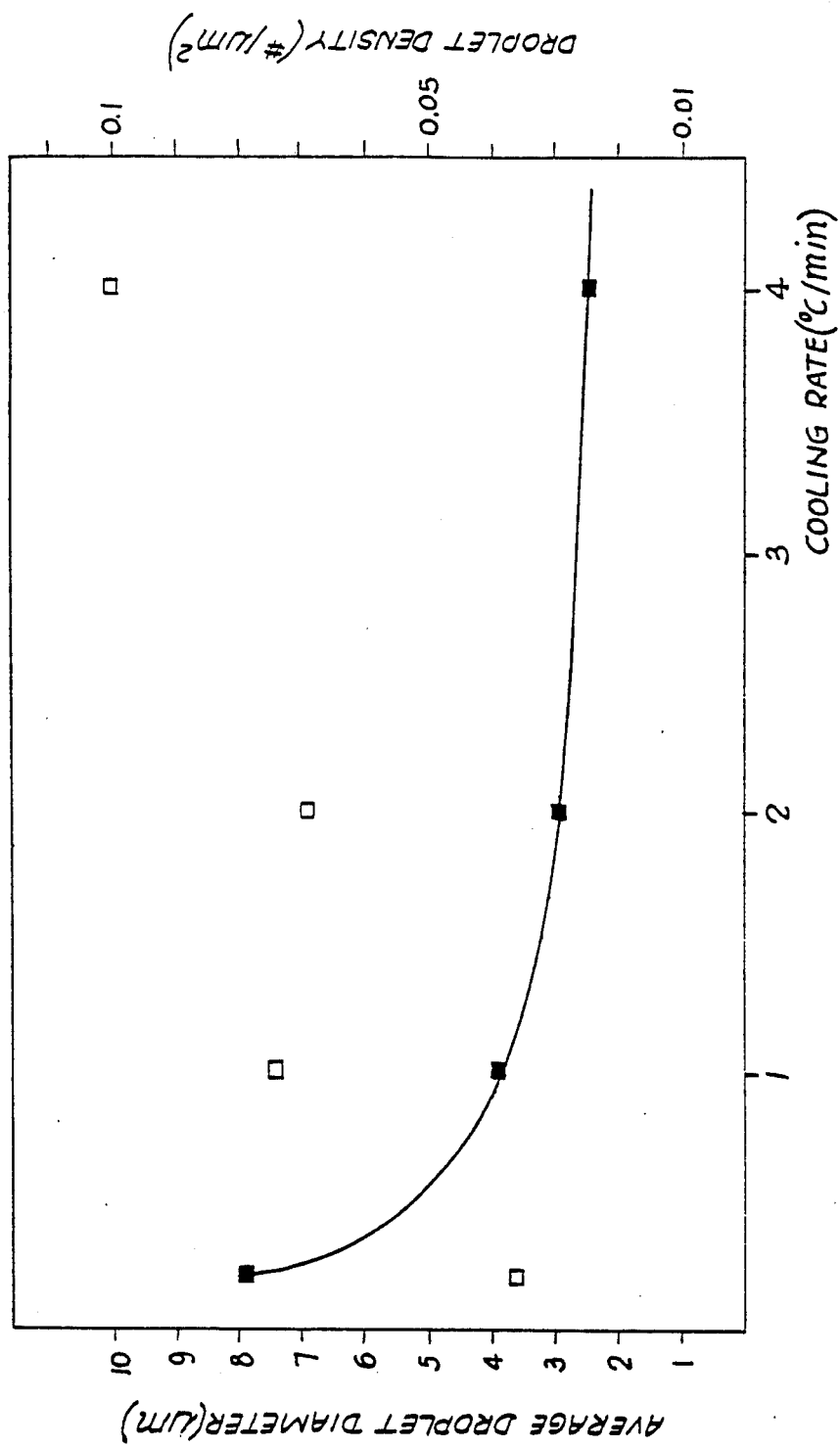
FIG. 2 is a graph of average microdroplet diameter versus rate of cooling of the material of the invention.

Thermoplastics, such as modified epoxies, reversibly melt or different temperatures and cool into the solid state at different, controllable rates. If, by cooling a homogeneous solution of liquid crystal and thermoplastic, a temperature is reached wherein the liquid crystal and liquid polymer are immiscible, phase separation occurs. Thus temperature depends on the average molecular weight of the polymer and the concentration of liquid crystal. As best seen in FIG. 2, slowly decreasing the temperature when the materials are immiscible liquids gives time for the molecules to diffuse to their respective precipitation sites and results in larger droplets. The data in FIG. 2 are taken from Examples I and II, below. With fast cooling rates, the polymer solidifies long before thermodynamic equilibrium is reached so that the microdroplets do not have time to grow and a larger number of liquid crystal molecules remains trapped in the solid matrix. The cooling rate for thermoplastic plays a role similar to the temperature of cure or polymerization of thermosetting polymers.

Different thermosetting polymers, such as epoxies, which cure at different rates may yield microdroplets differing by more than 2 orders of magnitude. Table I summarizes this effect in two epoxies; see Examples VI–VIII below.

TABLE I

| Epoxy | Cure Time at 40° C. | Liquid Crystal | Average Diameter |
|---|---|---|---|
| EPON828 | 24 hours | 35% E7 | ~1.2 |
| Bostik | 1 hour | 35% E7 | ~0.6 |

As seen in Table I, at the same concentration and temperature, EPON 828 yields microdroplets twice the size of Bostik. As more fully appears below in the examples, the relative concentration of liquid crystal does not contribute to size in these systems until a maximum of about 40% to 50% is reached, when channel formation begins; see Examples VI and VIII.

The best modes of the invention are further illustrated and described by the following specific examples.

EXAMPLE I

Microdroplet growth rate control by differential cooling of a thermoplastic-liquid crystal solution was measured by preparing a modified epoxy-liquid crystal cell. 1 equivalent EPON 828 (from Miller-Stephenson Company, Ct.) was mixed with 1 equivalent hexylamine and liquid crystal E7 (from EM Chemicals, a mixture consisting of (by weight) 4'-n-pentyl-n-cyano-biphenyl (5CB), 51%, 4'-n-heptyl-n-cyano-biphenyl (7CB), 21%, 4'-n-octoxy-4-cyano-biphenyl, 16%, and 4'-n-pentyl-4-cyano-terphenyl, 12%, to form a plastic to liquid crystal ratio of 60:40 by weight. The mixture was cured at 65° C. in bulk overnight to form a solid, white material. A slug was cut from the bulk preparation and placed between glass slides spaced apart at 26 $\mu$m and having transparent conducting electrodes. The slides were placed on a microscope hot stage (Mettler FP5) at 80° C. and clamped down until the material flowed and the slides contacted the spacers. At 80° C. the resultant cell was clear and transparent. The hot stage was programmed to cool at controlled rates. The results of heating the same cell to 80° C. and cooling it at various rates are summarized in Table II.

TABLE II

| Rate of cooling (C.°/minute) | Average Microdroplet Diameter ($\mu$m) |
|---|---|
| 0.2 | 8 |
| 1.0 | 3.9 |
| 2.0 | 2.8 |
| 4.0 | 2.5 |

As seen in Table II, slow cooling results in very large microdroplets useful for longer modulating wavelengths of light, whereas faster cooling leads to smaller droplets useful for shorter wavelengths.

EXAMPLE II

A modified epoxy-liquid crystal cell was prepared by mixing 40% by weight of liquid crystal to 60% by weight of a 1:1 by equivalents mixture of EPON 828 and t-butylamine, curing the mixture overnight at 60° C. and preparing a cell as in Example I. The cell was repeatedly heated and cooled at various rates. The results are summarized in Table III.

TABLE III

| Rate of cooling (C.°/minute) | Average Microdroplet Diameter ($\mu$m) |
|---|---|
| 0.2 | 8 |
| 1.0 | 3.9 |
| 2.0 | 3.0 |
| 4.0 | 2.6 |

Uncontrolled cooling, e.g., placing the cell on an aluminum block, yielded microdroplets having a size too small to measure with an optical microscopic (<1 $\mu$m).

EXAMPLE III

Microdroplet growth rate control by differential cure temperature of a resin-liquid crystal solution was measured by preparing epoxy-liquid crystal cells. EPON 828, Capcure 3-800 (Miller-Stephenson) and liquid crystal E7 were mixed in an equivalent ratio of 1:1:1, and the mixture placed between 4 sets of glass slides spaced apart at 26 $\mu$m and having transparent conducting electrodes. Each slide was placed in a temperature controlled oven and allowed to keep overnight until phase separation and curing were complete. The results of curing the cells at different temperatures are summarized in Table IV.

TABLE IV

| Microdroplet Size ($\mu$m) | Cure Temperature | | | |
| | 70° C. % | 60° C. % | 50° C. % | 40° C. % |
|---|---|---|---|---|
| >0.1 | 6.1 | — | — | — |
| 0.1–0.2 | 64.2 | — | — | — |
| 0.2–0.3 | 21.4 | 10.0 | 0.6 | 0.9 |
| 0.3–0.5 | 8.3 | 14.9 | 2.9 | 5.1 |
| 0.5–0.7 | — | 17.5 | 5.2 | 11.6 |
| 0.7–0.9 | — | 18.9 | 13.8 | 19.5 |
| 0.9–1.1 | — | 19.6 | 24.2 | 36.0 |
| 1.1–1.3 | — | 12.1 | 30.0 | 17.6 |
| 1.3–1.5 | — | 6.7 | 17.4 | 8.4 |
| 1.5–1.7 | — | 0.3 | 4.7 | 0.9 |
| 1.7–1.9 | — | — | 1.2 | — |
| 1.9 | — | — | — | — |
| Average Diameter | 0.2 $\mu$m | 0.8 $\mu$m | 1.1 $\mu$m | 0.9 $\mu$m |

As seen in Table IV curing at 70° C. accelerates the rate of curing of the resin and results in smaller microdroplets.

The results in Table IV were calculated by counting the number of droplets in a unit square area and normalizing the number of droplets within a size range to yield the percentages shown. Curing at higher temperatures also affected the number of nucleation sites and the relative density of droplets in each cell, as seen in Table V.

TABLE V

| Cure Temperature | # of droplets per ($\mu$m)$^2$ |
|---|---|
| 60° C. | 0.0138 |
| 50° C. | 0.0154 |
| 40° C. | 0.0203 |

EXAMPLE IV

Microdroplet growth rate control by relative concentration was assessed in epoxy-liquid crystal cells as in Example III. Mixtures ranging from about 20% to about 40% E7 by weight were prepared and cured at 60° C. Table VI summarizes the ranges of microdroplets size versus relative concentration of liquid crystal.

TABLE VI

| % Liquid Crystal | Diameter (μm) |
|---|---|
| <20% | no droplet formation |
| ~25–35% | ~1.30 |
| >40% | droplet coalescence |

EXAMPLE V

Microdroplet growth rate control by differential cure temperature and relative concentration was assessed by preparing epoxy-liquid crystal cells. Bostik (Bostik S.p.a., Milan Italy) 1:1 parts A and B was mixed with liquid crystal E7 to form 35% and 40% liquid crystal to plastic ratios by weight. The mixtures were poured between glass slides and cured until opaque at various temperatures. Table VII summarizes the range of droplet diameters in microns versus cure temperature for the two mixtures.

TABLE VII

| | Cure Temperature | | | |
|---|---|---|---|---|
| | RT | 40° C. | 60° C. | 80° C. |
| 35% E7 | 0.6 ± 0.3 | 0.6 ± 0.3 | 0.7 ± 0.4 | 0.5 ± 0.2 |
| 40% E7 | 4.0 | 2.5 ± 1.0 | 1.2 ± 0.3 | 0.8 |

35% E7 by weight resulted in nearly the same diameter droplet, about 0.6 microns, regardless of cure temperature, whereas 40% E7 by weight yielded microdroplets that decreased in size with increasing cure temperature.

EXAMPLE VI

Microdroplet growth rate control by relative concentration was assessed in epoxy-liquid crystal cells with Bostik, as in Example III. Mixtures ranging from about 10% to about 50% E7 by weight were prepared and cured at room temperature. Table VIII summarizes the ranges of microdroplet size versus relative concentration of liquid crystal.

TABLE VIII

| % Liquid Crystal | Diameter (μm) |
|---|---|
| <12 | no droplet formation |
| 14–16 | 0.2 |
| 22–35 | 0.5 |
| 37–43 | 1.0 |
| >44 | droplet coalescence |

EXAMPLE VII

Epoxy-liquid crystal cells as in Example IV were prepared with the relative concentration of E7 varying from about 14% to about 45% by weight. Samples were divided into three groups and cured at 40° C., 60° C. and 80° C. respectively. Tables IX A, B, C, summarize the results.

TABLE IX A

| cured at 40° C. | |
|---|---|
| % Liquid Crystal | Average Diameter |
| <15 | no droplet formation |
| 16–20 | ~0.2 |
| 24–35 | ~0.5 |
| 36–38 | ~0.1 |
| >38 | droplet coalescence |

TABLE IX B

| cured at 60° C. | |
|---|---|
| <22 | no droplet formation |
| 24 | ~0.2 |
| 26–35 | ~0.5 |
| 36–38 | ~0.1 |
| >38 | droplet coalescence |

TABLE IX C

| cured at 80° C. | |
|---|---|
| <28 | no droplet formation |
| 32 | ~0.2 |
| 36–38 | ~0.5 |
| 42–47 | ~1.0 |
| >47 | droplet coalescence |

We claim:

1. In a method of making liquid crystal microdroplets dispersed in a polymeric matrix by phase separating a homogeneous solution of liquid crystal and polymer, the improvement comprising the step of controlling microdroplet growth so that the microdroplets have a selected average diameter when phase separation is complete.

2. The improvement as claimed in claim 1 wherein the homogeneous solution comprises a curable synthetic polymer and liquid crystal and wherein the step of controlling microdroplet growth is carried out by controlling the rate of curing.

3. The improvement as claimed in claim 2 wherein controlling the rate of curing is carried out by selecting a curable synthetic polymer having a predetermined curing rate at a given temperature.

4. The improvement as claimed in claim 3 including the further step of adjusting the temperature at which curing occurs to accelerate or retard the rate of curing.

5. The improvement as claimed in claim 4 wherein the temperature is about room temperature to 80° C.

6. The improvement as claimed in claim 4 wherein the temperature is adjusted to yield microdroplets having an average diameter of about 0.1 to 8 microns.

7. The improvement as claimed in claim 2 wherein controlling the rate of curing is carried out by adjusting the intensity of ultraviolet radiation.

8. The improvement as claimed in claim 2 wherein the step of controlling the rate of curing is carried out by adjusting the temperature of which curing occurs.

9. The improvement as claimed in claim 1 wherein the step of controlling microdroplet growth is carried out by adjusting the ratio of liquid crystal to polymer.

10. The improvement as claimed in claim 9 in which the ratio of liquid crystal to polymer is about 1:9 to about 1:1 by weight.

11. The improvement as claimed in claim 10 wherein the temperature is about room temperature to 80° C.

12. The improvement as claimed in claim 10 wherein the temperature is adjusted to yield microdroplets having an average diameter of about 0.1 to 8 microns.

13. The improvement as claimed in claim 1 wherein the homogeneous solution comprises liquid crystal and thermoplastic polymer heated to a temperature sufficient to dissolve the liquid crystal and wherein the step of controlling microdroplet growth is carried out by controlling the rate of cooling of the heated solution.

14. The improvement as claimed in claim 13 wherein the rate of cooling is about 0.2° to 4° C. per minute.

15. The improvement as claimed in claim 13 wherein the rate of cooling is effective to yield microdroplets having an average diameter of about 0.1 to 8 microns.

16. The improvement as claimed in claim 1 wherein the ratio of liquid crystal to polymer is about 1:9 to about 1:1 by weight.

17. The improvement as claimed in claim 1 wherein the step of controlling microdroplet growth is carried out by adjusting the rate of evaporation of a solvent from the homogeneous solution.

* * * * *

UNITED STATES PATENT AND TRADEMARK OFFICE
CERTIFICATE OF CORRECTION

PATENT NO : 4,673,255
DATED : June 16, 1987
INVENTOR(S) : WEST et al.

It is certified that error appears in the above-identified patent and that said Letters Patent is hereby corrected as shown below:

Insert the following paragraph at column 1, line 5:

---The United States government has a paid-up license in this invention and may have the right in limited circumstances to require the patent owner to license others on reasonable terms as provided for by the terms of Grants DMR82-44468 and DMR85-03219, awarded by the National Science Foundation.---

Signed and Sealed this

Twenty-ninth Day of December, 1998

*Attest:*

BRUCE LEHMAN

*Attesting Officer*  *Commissioner of Patents and Trademarks*